May 26, 1959
J. W. DAVIDSON
2,888,075
WIRE CUTTING MACHINE
Filed Oct. 5, 1953
3 Sheets-Sheet 1
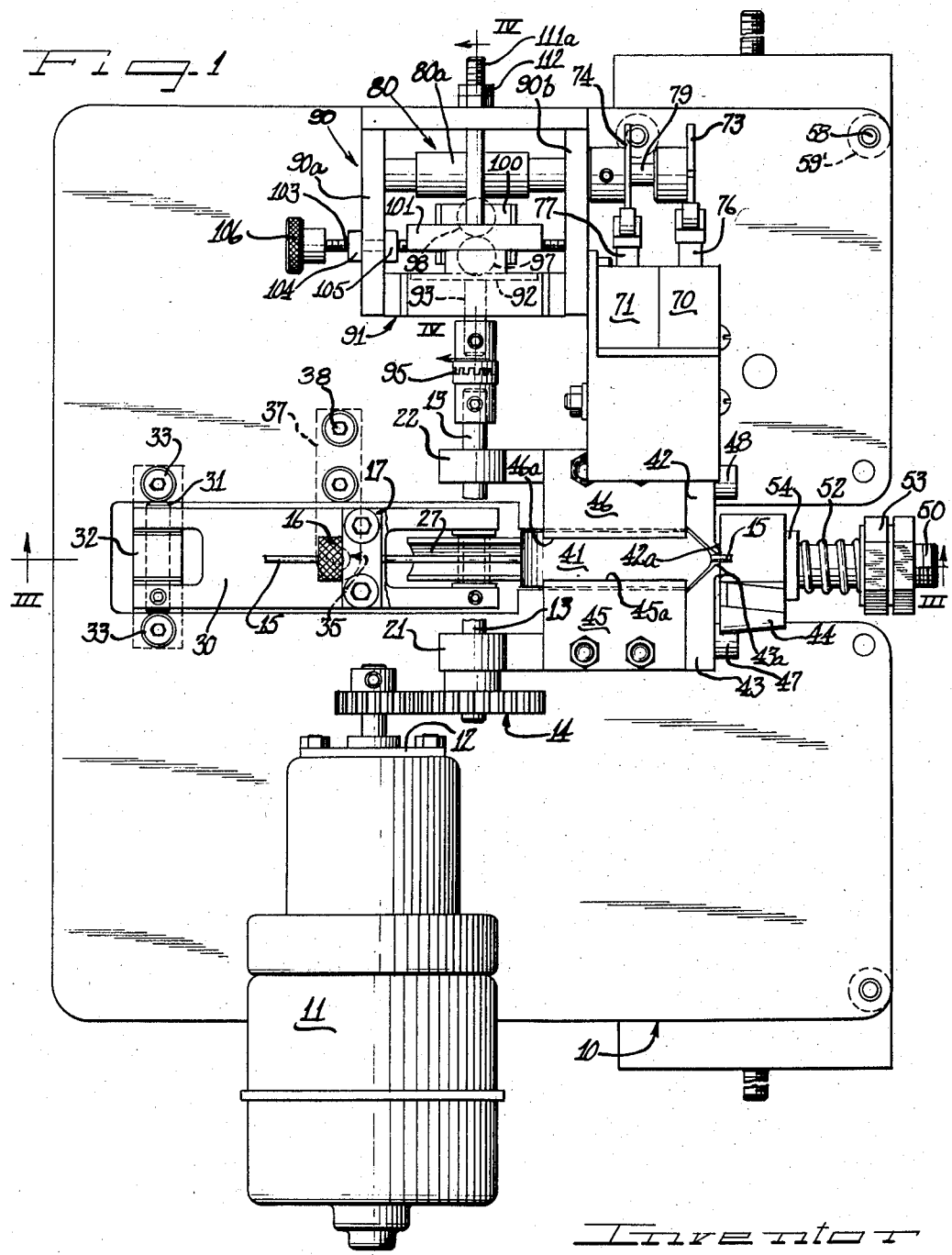
Inventor
James W. Davidson

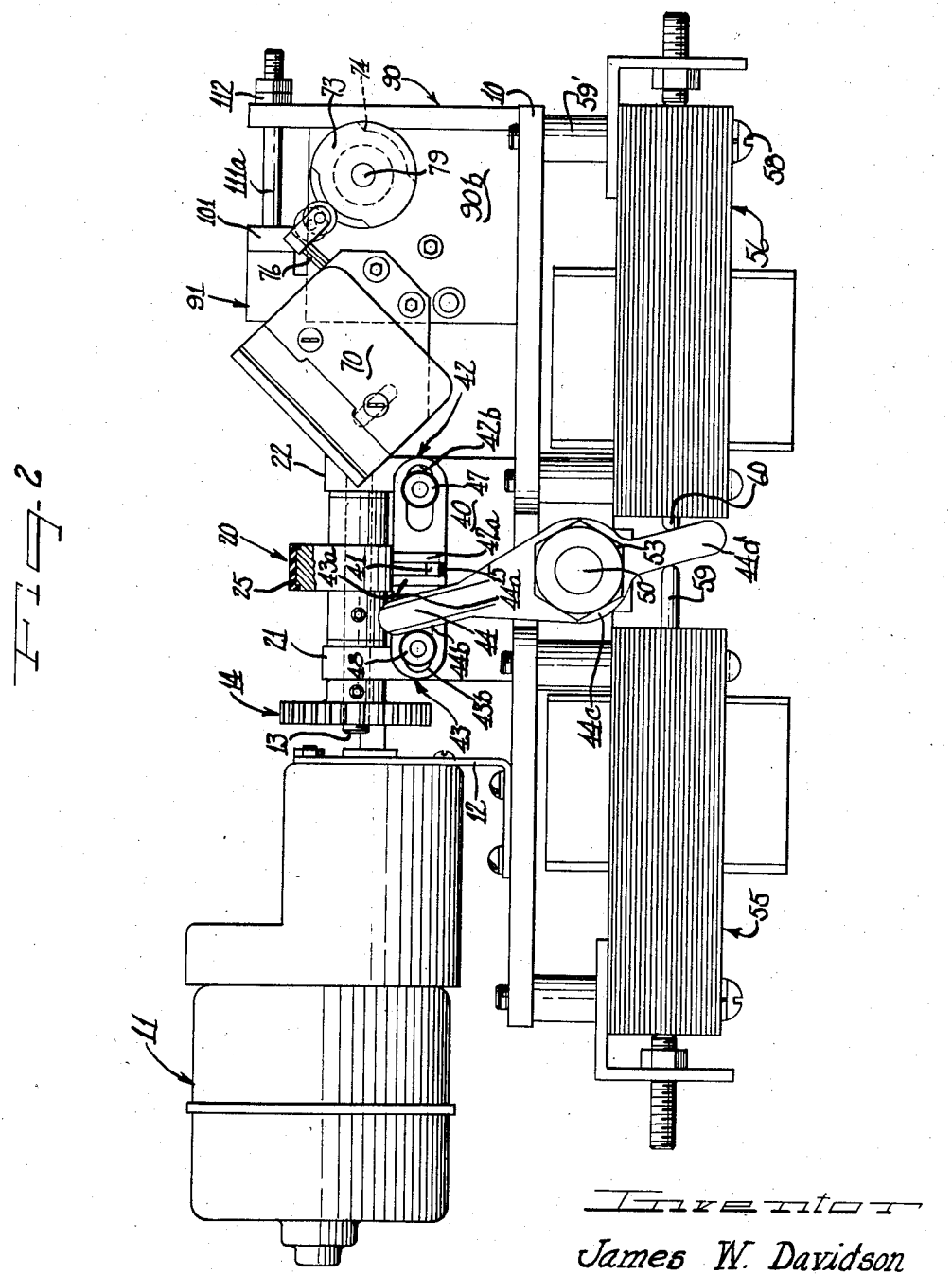

May 26, 1959
J. W. DAVIDSON
2,888,075
WIRE CUTTING MACHINE
Filed Oct. 5, 1953
3 Sheets-Sheet 3
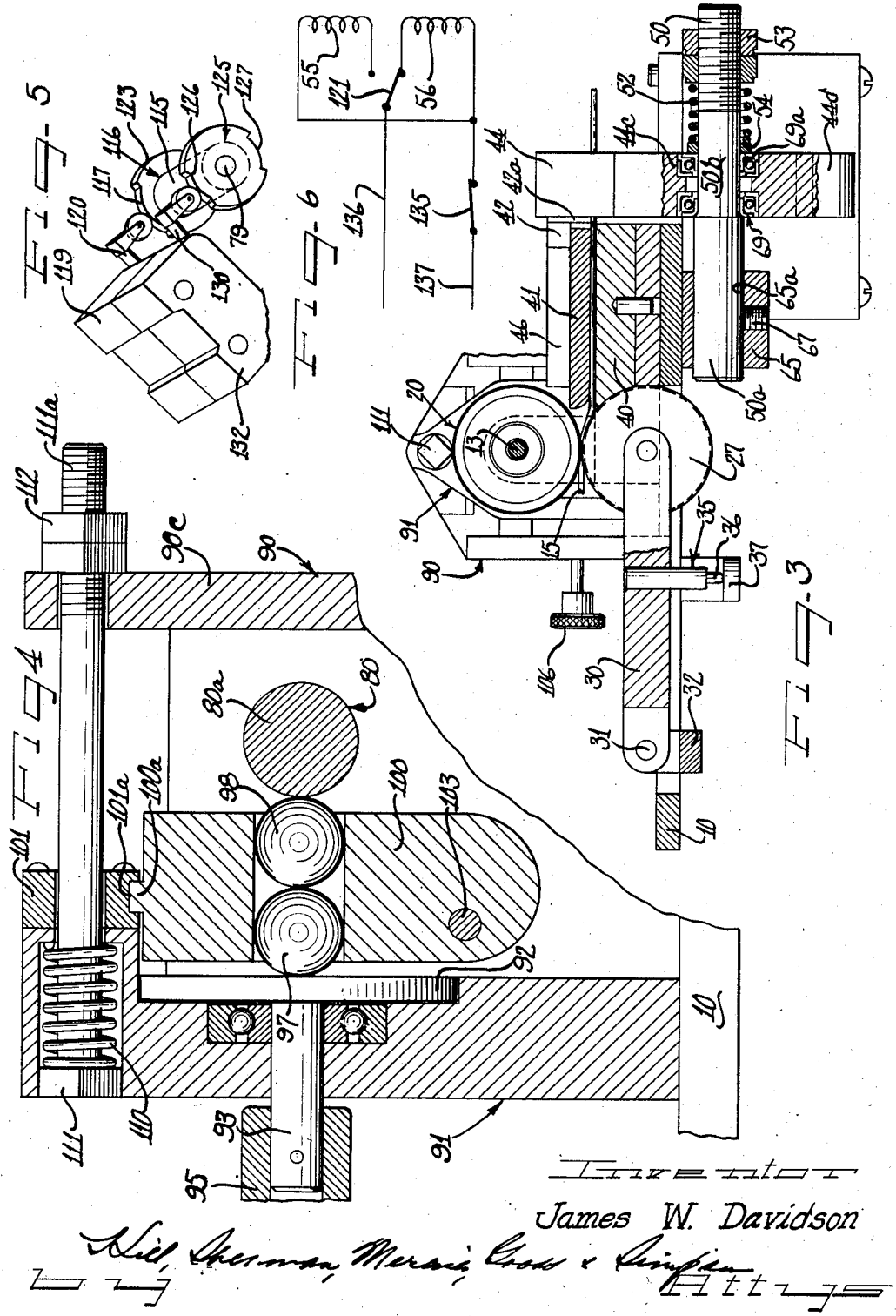
Inventor
James W. Davidson
Attys United States Patent Office 2,888,075
Patented May 26, 1959

2,888,075

WIRE CUTTING MACHINE

James W. Davidson, Chagrin Falls, Ohio, assignor to Thompson Ramo Wooldridge, Inc., a corporation of Ohio Application October 5, 1953, Serial No. 384,006

1 Claim. (Cl. 164—42)

The present invention relates to a machine for cutting wire or the like into predetermined lengths.

It is an object of the present invention to provide a novel wire cutting machine having a universal adjustment of cutting length.

It is a further object of the present invention to provide a wire cutting machine wherein the length of wire cut by the machine remains at its predetermined value in spite of variations in the rate of delivery of wire to the machine.

It is a further object of the present invention to provide a wire cutting machine wherein the lengths of wire to be cut are determined by a control mechanism which is driven by the wire feed, but wherein the control mechanism constitutes an extremely light load thus obviating slippage which might upset the ratio of wire speed to cutter speed.

It is another object of the present invention to provide a wire cutting machine wherein the cutting rate may be varied readily even while the machine is operating.

It is yet another object of the present invention to provide a wire cutting machine which represents a minimum initial cost and is of portable size, but which will perform in a manner equivalent to much larger stationary type conventional designs.

According to the present invention a single motor is utilized to drive wire at a relatively constant predetermined speed through a wire cutting machine, and to further drive an infinitely variable speed unit which controls the rate of cutting. The wire is advanced at a constant rate while the output of the variable speed unit actuates electric switch means at a rate commensurate with the desired wire length. The switch means may actuate a solenoid operated cutter for severing portions of the wire of the selected length. In this manner the range of the length of wire to be cut may be continuously variable over the range of the machine, and is synchronized with the motor speed so as to maintain the length of the cut uniform in spite of motor speed variations. Since the variable speed unit does not drive the cutter directly, but simply operates electric switches, there is no danger of slippage in the variable speed unit such as might upset the ratio of wire speed to cutter speed.

The novel features which I believe to be characteristic of my invention are set forth with particularity in the appended claim. My invention itself, as to its organization, manner of construction, and method of operation, together with further objects and advantages thereof, may best be understood by reference to the following description, taken in connection with the accompanying drawings, in which:

Figure 1 is a top plan view of a wire cutting machine according to the present invention, with upper guide roller 20 omitted;

Figure 2 is a side elevational view of the machine of Figure 1;

Figure 3 is a longitudinal sectional view taken substantially along the line III—III of Figure 1;

Figure 4 is a transverse sectional view taken substantially along the line IV—IV of Figure 1;

Figure 5 is a fragmentary somewhat diagrammatic perspective view of a modified solenoid actuating assembly according to the present invention; and Figure 6 is a schematic wiring diagram illustrating the electrical operation of the modification of Figure 5.

As shown on the drawings:

Referring to Figure 1, it will be observed that the wire cutting machine includes a base 10 mounting a motor 11 by means of a bracket 12, the motor being coupled to a drive shaft 13 through gearing indicated at 14. The wire 15 is fed into the machine through a wire guide bushing 16 carried by an apertured guide block 17.

For driving the wire through the machine, a wire drive roller 20, Figure 2, is fixed to shaft 13, the roller 20 being suitably positioned between shaft journals 21 and 22. As indicated in Figure 2, the drive roller 20 may be provided with a suitable rubber tire 25 for good frictional engagement with the wire. Cooperating with the drive roller is a wire drive tensioning roller 27, Figure 1, disposed below the drive roller 20 and adapted to urge the wire into good frictional engagement with the drive roller 20.

For tensioning the lower roller 27 against the drive roller 20, as indicated in Figure 3, the roller 27 may be mounted by means of an arm 30 pivotally mounted on a shaft 31 to a bracket 32 secured to the underside of the base 10 by means of screws 33, Figure 1. Intermediate the ends of the arm 30, a spring plunger assembly 35, Figure 3, is provided having a spring urged plunger 36 engaging an abutment plate 37 secured to the underside of the base 10 by means of screws 38, Figure 1, to urge the arm 30 in the upward direction about pivot 31. The assembly 35 is threadedly carried by the arm 30 for adjusting the tension of the lower roller 27.

Referring to Figure 3, it will be observed that the wire 15 is driven by rolls 20 and 27 through a groove in the top surface of a guide block 40, guide shoe 41 retaining the wire in the groove. Clamping blocks 45 and 46 are disposed on opposite sides of guide shoe 41 to position the same laterally and have overhanging flanges 45a and 46a for preventing vertical displacement of the shoe 41, Figure 1.

After traveling through the groove in the block 40, the wire passes between the stationary cutters 42 and 43 having edges 42a and 43a for cooperating with blades 44a and 44b of movable cutter 44. As the cutter 44 is moved to the right in Figure 2, a length of wire is severed by blade 44a in conjunction with edge 42a of stationary cutter 42. After a further predetermined length of wire has traveled between the stationary blades, the cutter 44 is moved to the left to sever a further predetermined length of wire by means of cutter blade 44b and stationary cutter edge 43a, Figure 1. It will be observed from Figure 2, that the stationary cutters 42 and 43 are adjustable by means of slots 42b and 43b in cooperation with screws 47 and 48 to adjust the spacing between the cutter edges 42a and 43a.

For mounting the oscillating cutter 44, a stud 50 extends through a central aperture in the body portion 44c thereof, Figure 3, and has a compression spring 52 tensioned against the cutter by means of nuts 53 and a washer 54 so as to frictionally damp the oscillatory movements of the cutter 44 and to urge the cutter 44 into close relation to stationary cutting edges 42a and 43a. For driving the cutter 44 in opposite directions, a pair of solenoids 55 and 56 are supported from the base 10 by means of screws 58 and spacers 59' and are provided with armatures 59 and 60, respectively, abutting an extension 44d of the cutter 44. These solenoids may be constructed so as to urge the respective armatures outwardly when energized to alternately shift the position of cutter 44.

As indicated in Figure 3, the stud 50 may be carried in a mounting block 65 secured to the base 10. The stud has a smooth shank portion 50a telescoping in a bore 65a in the block 65 and fixed therein by means of a set screw 67. The oscillating cutter 44 is journaled on a reduced shank portion 50b by means of bearings 69. The spring 52 thus serves to urge the outer bearing race 69a axially inwardly to urge the cutter 44 into close fitting relation to the stationary cutters 42 and 43.

For sequentially energizing the solenoids 55 and 56 to cut the wire 15 into predetermined lengths, a pair of switches 70 and 71 are provided, the switches 70 and 71 being operated by means of cams 73 and 74 through follower arms 76 and 77. The cams 73 and 74 are secured to a shaft 79 which is driven by means of a variable speed drive 80 from the motor drive shaft 13, Figure 1.

It will be readily understood by those skilled in the art that the switches 70 and 71 are connected respectively in the energizing circuits for the solenoids 55 and 56 so that when the switch 70, for example, is closed by means of the cam 73, the solenoid energizing circuit for the solenoid 55 is completed to energize the solenoid 55 and to project the armature 59. Subsequently when the switch 70 is open, the cam 74 may close the switch 71 to close the energizing circuit for the solenoid 56 and to project the armature 60 to oscillate the cutter 44. Preferably, the cams 73 and 74 are arranged and constructed so that the switch 70 is closed after a first 180° rotation of the shaft 79 and so that the switch 71 is closed after a further 180° rotation of the shaft 79. Thus the switches are actuated in uniform sequence when the shaft 79 is rotated at constant speed.

A suitable variable speed drive has been illustrated in Figure 4. As illustrated in Figures 1 and 4, the drive may comprise a framework 90 fixed to the base plate 10 and a movable bearing member 91 journaling a drive disk 92 which is coupled with the drive shaft 13 by means of a shaft 93 and multi-jaw coupling 95. Cooperating with the disk 92 are a pair of balls 97 and 98 which transmit driving force from the disk 92 to an enlarged portion 80a of the shaft 80. The balls are carried in an adjustment member 100 which has a flange 100a riding in a groove 101a in a guide block 101 secured to the bearing member 91.

For shifting the position of member 100, an adjustment screw 103 is journalled in a side plate 90a of the frame 90, Figure 1, and retained by means of collars 104, 105. Rotating the screw 103 by means of the knob 106 causes the adjustment member 100 to be moved along the guide block 101 with the flange 100a traveling in the groove 101a to move the balls 97 and 98 radially of the disk 92. Since the surface speed of the portion of the disk contacting the ball 97 increases as the ball is moved radially, the shaft 80 is driven at a progressively greater speed to progressively increase the cutting rate, and decrease the length of wire being cut.

For resiliently urging the disk 92 into engagement with the ball 97, a spring 110 is provided engaging at one end a portion of the mounting block 91 and at the other end the head of a disk tensioning screw 111 secured to the frame end wall 90c, Figure 4. The tension of the disk 92 may be adjusted by means of nuts such as 112 on the threaded end 111a of the screw 111.

Thus, to adjust the length of wire being cut by the machine, the knob 106, Figure 1, is rotated to adjust the speed of the shaft 80, which in turn adjusts the speed of operation of the switches 70 and 71 to adjust the operation of the solenoids 55 and 56, Figure 2. The speed may be readily adjusted while the machine is operating, and since the speed of operation of the cams 73 and 74 is synchronized with the speed of the motor 11, variations in the speed of the motor do not cause variations in the length of the wire being cut. It will be further apparent that since the variable speed drive need only drive the shaft 80 and the cams 73 and 74 and the light switch arms 76 and 77 associated therewith, the load on the variable speed drive is very light, obviating slippage that might upset the ratio of wire speed to cutter speed.

An alternative manner of actuating solenoids 55 and 56 is illustrated in Figures 5 and 6. In this embodiment, a single cam member 115 is mounted on the output shaft 79 of the variable speed drive. This member has a first cam flange 116 with a long dwell recess 117 therein. A single pole, double throw switch 119 has a follower arm 120 cooperating with flange 116 and is constructed to maintain its movable contact 121, Figure 6, in upper position while the arm 120 rides on the raised portion 123 of flange 116 and in lower position when the arm rides in recess 117.

A second cam flange 125 of member 115 has two short dwell recesses 126 and 127 at diametrically opposite portions of the flange. The recess 126 is centered with respect to recess 117 so that contact 121 moves to lower position before follower arm 130 associated with flange 125 moves into engagement with recess 126 and so that follower arm 130 moves out of recess 126 before contact 121 moves to upper position. Switch 132 controlled by arm 130 may be a single pole, single throw switch and may be closed each time arm 130 engages in recess 126 or 127.

The operation of the circuit of Figure 6 will now be readily understood. With the shaft 79 in the angular position illustrated in Figure 5, the contact 121 will be in lower position and contact 135 of switch 132 will be in closed position to energize solenoid 56 from supply lines 136, 137. When the shaft 79 rotates through 180° contact 121 will be in upper position due to the fact that follower 120 is riding on raised portion 123, and contact 135 will again be closed since follower 130 will be engaged in recess 127. Solenoid 55 will then be energized.

Thus, cam flange 125 is used to trigger each cutter movement while cam flange 116 acts as a selector of the solenoid to be energized.

Fine adjustment of the cams to equalize the wire lengths cut by the alternate solenoids is eliminated since a single cam flange controls triggering of both solenoids. Further adjustment is avoided by forming the cam flanges 116 and 125 on a single member.

It will be understood that cams 73 and 74 of the embodiment of Figures 1 to 4 may also be formed on a single member to avoid the necessity for relative angular adjustments between the cams.

It will be understood that modifications and variations may be effected without departing from the scope of the novel concepts of the present invention.

I claim as my invention:

A wire cutting machine comprising cutter means, wire feed means for delivering wire to said cutter means, means for driving said feed means, first and second electrically operated actuating means for alternately actuating said cutter means, a common energizing circuit for said first and second actuating means, first electric switch means for shifting between first and second positions for alternately connecting said first and second actuating means with said common energizing circuit, second switch means for completing the energizing circuit in each position of the first switch means for a predetermined time period, first rotary cam means for cyclically shifting said first switch means between its first and second positions, second rotary cam means for cyclically actuating and deactuating said second switch means in each position of said first switch means, a variable speed drive having an input shaft driven in synchronism with said wire feed means and having an output shaft driving said first and second rotary cam means and having means frictionally coupling said input shaft to said output shaft accommodating an adjustable speed ratio between said shafts, said second rotary cam means providing precisely equal time periods between successive actuations of said second switch means to provide equal lengths of wire between energization of said first actuating means and then said second actuating means as between energization of said second actuating means and then said first actuating means and the variable speed drive having means for adjusting the rate of rotation of said rotary cam means relative to said wire feed means to adjust the wire length between successive energizations of said first and second actuating means.

References Cited in the file of this patent

UNITED STATES PATENTS

| | | |
|---|---|---|
| 2,007,345 | Roberts | July 9, 1935 |
| 2,022,574 | Schreck | Nov. 26, 1935 |
| 2,023,851 | Nehlsen | Dec. 10, 1935 |
| 2,060,822 | Novick | Nov. 17, 1936 |
| 2,067,489 | Howey et al. | Jan. 12, 1937 |
| 2,080,575 | Perry | May 18, 1937 |
| 2,151,438 | Pierce | Mar. 21, 1939 |
| 2,505,395 | Gratzmuller | Apr. 25, 1950 |
| 2,581,960 | Kronenwetter | Jan. 8, 1952 |
| 2,586,903 | Badenhausen et al. | Feb. 26, 1952 |
| 2,588,663 | Schane | Mar. 11, 1952 |
| 2,601,174 | Smith | June 17, 1952 |
| 2,644,645 | Bevevino | July 7, 1953 |
| 2,715,164 | Hufnagel | Aug. 9, 1955 |
| 2,734,570 | Hallden | Feb. 14, 1956 |